(12) United States Patent
Kwon et al.

(10) Patent No.: US 10,534,333 B2
(45) Date of Patent: Jan. 14, 2020

(54) SPACE IMPLEMENTATION METHOD AND APPARATUS THEREFOR

(71) Applicant: UNIVERSITY-INDUSTRY COOPERATION GROUP OF KYUNG HEE UNIVERSITY, Seoul (KR)

(72) Inventors: Oh Byung Kwon, Seoul (KR); Jae Moon Sim, Daegu (KR)

(73) Assignee: UNIVERSITY-INDUSTRY COOPERATION GROUP OF KYUNG HEE UNIVERSITY, Seoul (KR)

(*) Notice: Subject to any disclaimer, the term of this patent is extended or adjusted under 35 U.S.C. 154(b) by 294 days.

(21) Appl. No.: 15/525,785

(22) PCT Filed: Nov. 12, 2015

(86) PCT No.: PCT/KR2015/012186
§ 371 (c)(1),
(2) Date: May 10, 2017

(87) PCT Pub. No.: WO2016/108424
PCT Pub. Date: Jul. 7, 2016

(65) Prior Publication Data
US 2018/0120792 A1    May 3, 2018

(30) Foreign Application Priority Data

Dec. 31, 2014  (KR) .................. 10-2014-0195368

(51) Int. Cl.
*G05B 15/02* (2006.01)
*G06F 16/951* (2019.01)
(Continued)

(52) U.S. Cl.
CPC ....... *G05B 15/02* (2013.01); *G06F 16/24575* (2019.01); *G06F 16/951* (2019.01); *H04L 12/1845* (2013.01)

(58) Field of Classification Search
None
See application file for complete search history.

(56) References Cited

U.S. PATENT DOCUMENTS 5,774,674 A * 6/1998 Gutmann .................. G06T 1/00
348/E7.081
7,881,235 B1 * 2/2011 Arthur ................ H04L 12/1818
370/261

(Continued)

FOREIGN PATENT DOCUMENTS

JP    2002-197042 A    7/2002
JP    2010-124237 A    6/2010
(Continued)

*Primary Examiner* — Alexander Q Huerta
(74) *Attorney, Agent, or Firm* — Novick, Kim & Lee, PLLC; Jae Youn Kim (57) ABSTRACT

Provided is a space implementation method and, more particularly, a space implementation method which identically implements, in a user's space, acoustic contents such as music and sound, visual contents such as photos, drama and movies, and other contents such as scent and feel which are being implemented in the space of another user such as a family member, a lover, a friend or an entertainer, thereby forming connectedness between family members or lovers who are in different places, or enabling the user to share event contents enjoyed by entertainers who the user likes.

9 Claims, 6 Drawing Sheets

(51) Int. Cl.
 *G06F 16/2457* (2019.01)
 *H04L 12/18* (2006.01)

(56) References Cited

U.S. PATENT DOCUMENTS

| | | | | |
|---|---|---|---|---|
| 9,223,786 | B1* | 12/2015 | Hamrick | G06F 16/4393 |
| 2004/0104935 | A1* | 6/2004 | Williamson | G06F 3/012 |
| | | | | 715/757 |
| 2004/0117822 | A1* | 6/2004 | Karaoguz | H04H 20/106 |
| | | | | 725/37 |
| 2004/0125120 | A1* | 7/2004 | Weiner | G06F 3/011 |
| | | | | 715/701 |
| 2008/0195703 | A1* | 8/2008 | Salesky | G06F 3/1415 |
| | | | | 709/204 |
| 2009/0237564 | A1* | 9/2009 | Kikinis | H04N 13/398 |
| | | | | 348/584 |
| 2013/0042174 | A1* | 2/2013 | Basso | G06Q 10/101 |
| | | | | 715/255 |
| 2014/0115092 | A1* | 4/2014 | Tofighbakhsh | H04L 67/22 |
| | | | | 709/217 |
| 2015/0092008 | A1* | 4/2015 | Manley | H04L 65/403 |
| | | | | 348/14.07 |
| 2017/0048592 | A1* | 2/2017 | Branch | H04N 21/41407 |
| 2017/0188066 | A1* | 6/2017 | Gaidar | A61L 9/015 |

FOREIGN PATENT DOCUMENTS

| | | |
|---|---|---|
| KR | 10-2012-0017907 A | 2/2012 |
| KR | 10-2012-0125938 A | 11/2012 |
| KR | 10-2014-0127345 B1 | 11/2014 |

\* cited by examiner

| User ID | Event Contents | Hardware Platform | Implementation Information | Index |
|---------|----------------|-------------------|----------------------------|-------|
| U001 | C001 | SUM1021,, SUM212 | 12/05 19:21 Family Meal | |
| U002 | C002 | DW993, Peppermint | 12/6 23:27 Reading Alone | Entertainer, KIM Gun Mo |
| U003 | C003 | TG3535, IN2625, Lavender | 12/6 23:54 Friends Meeting | |

FIG. 8

| | |
|---|---|
| Display (Identifier: 001) | SUM1021, SUM2915, SUM261,LG142, LG251, SO7373, TG3535....... |
| Audio (Identifier: 002) | SUM212, SUM624, SUM3736, LG3737, DW993, IN2625,...... |
| Scent Injection Device (Identifier: 003) | Peppermint, Lavender, Cherry, ... |

FIG. 9

SPACE IMPLEMENTATION METHOD AND APPARATUS THEREFOR

TECHNICAL FIELD

The present disclosure relates to a space implementation method. More particularly, the present disclosure relates to a space implementation method by which audio contents, such as music and sounds, visual contents, such as photographs and images in dramas and movies, and other contents, such as scents and senses of touch, that are implemented in a space of a counterpart, such as a family member, a lover, a friend, or an entertainer, are identically implemented in a user space, so that a bond can be created between family members or lovers who are in different locations or users can experience the same event contents enjoyed by a favored entertainer.

BACKGROUND ART

A human network refers to a virtual network consisting of individuals, who have become acquaintances through social interactions, as units. An acquaintanceship refers to a relationship between persons who trust each other to a predetermined degree since information, experiences, and ideas are shared within a predetermined range and the sense of belonging to the same community is shared to a predetermined degree. According to typical social lives, such acquaintanceships may derive from preceding acquaintances, may rely on family ties, school relationships, or regional relationships, or may be created by close personal ties acquired through belonging to a specific organization or during collaboration in a company or team.

Recently, due to the development and distribution of networks, such as the Internet, online acquaintances can be acquired and maintained. A range of various types of servicing technologies for supporting users to actively construct human networks on-line have been proposed, forming databases using constructed human networks, based on which users can search for persons having focused abilities, careers, and the like, create online human network relationships with new acquaintances, or further extend their own human networks based on such relationships, and allowing users to share a variety of files or types of information.

The development of human networks has significantly changed the manner of human communications. According to traditional communications methods of the past, people met in person to talk with each other or communicated via mail. In contrast, online human networks, such as mini-homepages, blogs, and message boards, allow people to communicate with remote counterparts in very short periods of time and close acquaintances or people having similar interests to talk about or share contents in virtual spaces.

Recently, members of an extended family often live separated from each other due to the tread toward nuclear families, or family members often live separated from each other due to education or business. In addition, lovers or close friends are tending to create bonds by sharing favored contents on-line. Furthermore, due to the significant growth of the entertainment market, the trend of having the items of favored entertainers is growing.

DISCLOSURE

Technical Problem

According to conventional human networks, users may disclose their daily lives to counterparts by posting photographs on message boards, mini-homepages, blogs, and the like, or users may post favored music or image contents on mini-homepages or blogs, allowing counterparts to share such contents by accessing the mini-homepages or blogs. However, users cannot share counterpart atmospheres in which family members, lovers, friends, favored entertainers, and the like are present. Therefore, there is strong demand for a space implementation method that can implement the same event contents in a user space as in a counterpart space, so that a user and a counterpart can feel being in the same space, thereby creating a strong bond between the user and the counterpart.

Accordingly, the present disclosure has been made in consideration of the above-described problems occurring in the related art, and the present disclosure proposes a space implementation method by which the atmosphere of a counterpart space in which a counterpart actually resides or is located can be identically implemented in a user space, so that a user and the counterpart can share the same spatial atmosphere.

Also provided is a space implementation method that can implement the same event contents in the user space of a user having a higher level of access authority as in the counterpart space, so that the user and the counterpart can have a stronger bond.

Also provided is a space implementation method that can implement event contents helpful for overcoming mental and physical problems, such as depression, tension, sleeplessness, and fatigue, in a user space, in order to help a user to overcome a mental or physical problem.

Also provided is a space implementation method that can provide information regarding the implementation of event contents implemented in a counterpart space, e.g. a date, a time, or a counterpart circumstance in which the event contents are implemented, so that a user can more accurately experience the atmosphere implemented in the counterpart space.

Technical Solution

According to an aspect of the present disclosure, a space implementation method may include: receiving, by a space server containing event contents in a counterpart space, event contents request message from a user terminal; determining whether or not the event contents are implementable in a user space by comparing a hardware platform implementing the event contents in the counterpart space with a hardware platform in the user space; and when the event contents are determined to be implementable in the user space, controlling the event contents to be implemented in the user space by providing the event contents to the user terminal. The event contents in the counterpart space include at least one of visual, audio, tactile, olfactory, and environmental contents that are implemented in the counterpart space.

Here, the hardware platform may be a combination of devices provided in the counterpart space to implement the event contents or devices provided in the user space to implement the event contents.

The step of determining whether or not the event contents are implementable may include: determining whether or not the hardware platform implementing the event contents in the counterpart space is same as the hardware platform in the user space by comparing the hardware platform implementing the event contents in the counterpart space with the hardware platform in the user space; when the hardware platform implementing the event contents in the counterpart space is not same as the hardware platform in the user space, determining whether or not the hardware platform implementing the event contents in the counterpart space is compatible with the hardware platform in the user space; and when the hardware platform implementing the event contents in the counterpart space is compatible with the hardware platform in the user space, determining the event contents to be implementable.

The hardware platform in the counterpart space may be determined whether or not to be same as the hardware platform in the user space, based on identifiers of devices of the hardware platform in the counterpart space and identifiers of devices of the hardware platform in the user space.

The hardware platform in the counterpart space may be determined whether or not to be compatible with the hardware platform in the user space, based on whether or not the hardware platform in the user space includes a device included in a group of compatible devices corresponding to identifiers of devices of the hardware platform in the counterpart space.

The space implementation method may further include: receiving indexes of the event contents to be implemented in the user space from the user terminal; and searching for event contents, from among disclosed event contents in the counterpart space, corresponding to the received indexes of the event contents. The searched event contents are determined whether or not to be implementable in the user space and determined implementability is provided to the user terminal.

The space implementation method may further include determining whether or not the user has authority to access the event contents of the counterpart based on a fried list of the counterpart. When the user has authority to access the event contents of the counterpart, the event contents in the counterpart space are provided to the user terminal.

The event contents in the counterpart space and information regarding implementation of the event contents in the counterpart space may be provided to the user terminal.

When a user in the fried list of the counterpart may have a higher level of access authority, the user space of the user is controlled such that same event contents as in the counterpart space are implemented in real time therein.

The space implementation method may further include: at a point in time in which the event contents in the counterpart space are received from a counterpart terminal, determining whether or not there is the user having the higher level of access in the friend list of the counterpart; transmitting an implementation message to the user terminal of the user having the higher level of access in the friend list of the counterpart, the implementation message notifying that the event contents are being implemented in the counterpart space; and when an implementation approval message is received from the user terminal, providing same event contents as the event contents implemented in the counterpart space to the user terminal in real time.

According to another aspect of the present disclosure, a space implementation method may include: at a point in time in which event contents to be implemented in a user space are received from a counterpart terminal, transmitting an implementation message to a user terminal, the implementation message notifying that event contents are being implemented in a counterpart space; when an implementation approval message is received from the user terminal, determining whether or not the event contents are implementable in the user space by comparing a hardware platform implementing the event contents in the counterpart space with a hardware platform in the user space; and when the event contents are determined to be implementable in the user space, controlling same event contents to be implemented in the user space as in the counterpart space by providing the event contents implemented in the counterpart space to the user terminal in real time. The event contents in the counterpart space include at least one of visual, audio, tactile, olfactory, and environmental contents implemented in the counterpart space.

The implementation message may be transmitted to the user terminal of a user having a higher level of access authority in a friend list of the counterpart.

Advantageous Effects

The space implementation method according to the present disclosure has a variety of effects as follows:

First, the space implementation method according to the present disclosure can implement the atmosphere of a counterpart space in which a counterpart actually resides or is located to be the same as being implemented in a user space, so that a user and the counterpart can share the same spatial atmosphere.

Second, the space implementation method can implement the same event contents in the user space of a user having a higher level of access authority as in the counterpart space, so that the user and the counterpart can have a stronger bond.

Third, the space implementation method can implement event contents helpful for overcoming mental and physical problems, such as depression, tension, sleeplessness, and fatigue, in a user space, in order to help a user to overcome a mental or physical problem.

Fourth, the space implementation method can provide information regarding the implementation of event contents implemented in a counterpart space, e.g. a date, a time, or a counterpart circumstance in which the event contents are implemented, so that a user can more accurately experience the atmosphere implemented in the counterpart space.

MODE FOR INVENTION

Hereinafter, a space contents providing method according to the present disclosure will be described in more detail with reference to the accompanying drawings.

Figure 1:
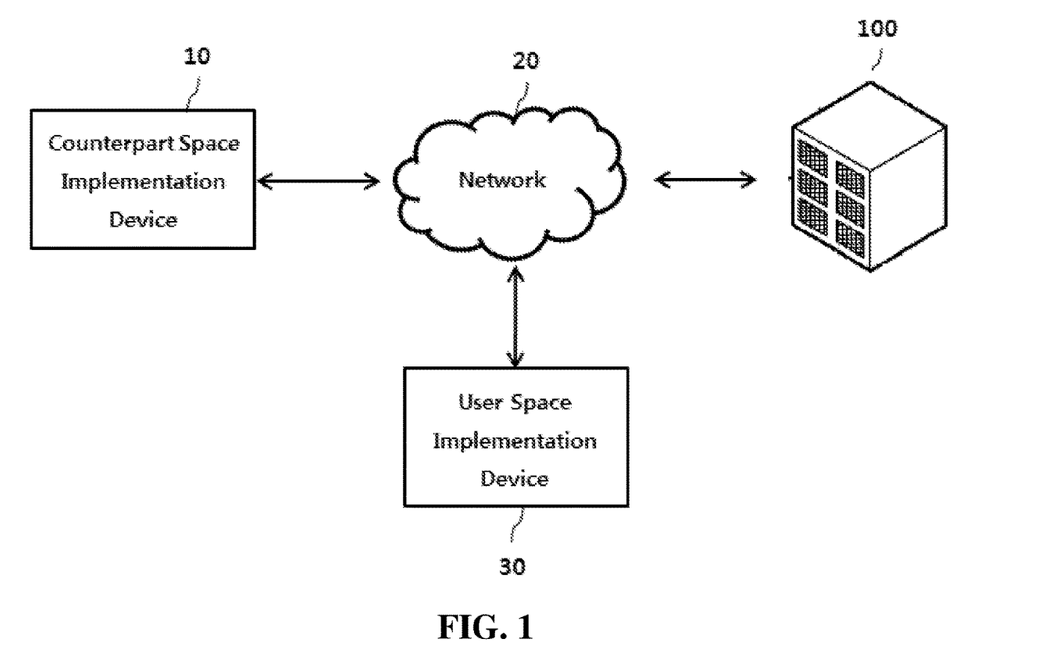
FIG. 1 illustrates a space implementation system according to an embodiment of the present disclosure.

FIG. 1 illustrates a space implementation system according to an embodiment of the present disclosure.

Referring to FIG. 1, the space implementation system according to the present disclosure includes a counterpart space implementation device 10, a network 20, a user space implementation device 30, and a space implementation server 100. The counterpart space implementation device 10, a user space implementation device 30, and the space implementation server 100 are connected to the network 20. According to the present disclosure, a plurality of counterpart space implementation devices 10 and a plurality of space implementation servers 100 may be connected to the network 20. This feature is within the scope of the present disclosure.

Here, the network 20 is the Internet, a public switched telephone network (PSTN), or the like, which can transmit and receive data between the counterpart space implementation device 10 and the space implementation server 100 or between the user space implementation device 30 and the space implementation server 100. A variety of wired and/or wireless networks may be used according to fields to which the present disclosure is applicable.

The counterpart space implementation device 10 is disposed in a counterpart space to generate event contents message including event contents that are implemented in the counterpart space and transmit the generated event contents message to the space implementation server 100 via the network 20. The counterpart space refers to a space in which a counterpart actually resides and in which a hardware platform implementing event contents is disposed.

Here, the hardware platform is a combination of a variety of devices that implement event contents. Examples of the hardware platform include an image display device, an audio device, a scent injection device, an environmental control device, a haptic device outputting tactile sensations, and the like, which are disposed in the counterpart space or in a user space. The image display device may include a variety of display devices, such as a television (TV), a beam projector, and a transparent screen, that can display visual contents. The audio device may include a variety of devices that can output audio contents, such as sounds or music. The haptic device may include a variety of devices that output tactile sensations, such as tactile sensations or vibrations. The scent injection device refers to any device able to inject various types of scents to the counterpart space or the user space. The environmental control device may include an air conditioning device, a lighting device, a humidifying device, and the like that can control the temperature, humidity, illumination, and the like of the counterpart space or the user space. The hardware platform may further include a variety of devices able to implement event contents in the user space or the counterpart space according to fields to which the present disclosure is applicable. The variety of devices are within the scope of the present disclosure.

Here, the term "event contents" refers to a combination of visual, audio, tactile, olfactory, and environmental contents. The visual contents include video images, photographs, and the like, implemented using the hardware platform in the counterpart space or the user space. The audio contents include sounds, music, and the like, implemented using the hardware platform in the counterpart space or the user space. The tactile contents include tactile sensations, vibrations, and the like, implemented using the hardware platform in the counterpart space or the user space. The olfactory contents include scent contents implemented using the hardware platform in the counterpart space or the user space. The environmental contents include environmental states, such as the temperature, humidity, illumination, and the like of the counterpart space or the user space.

The counterpart space and the user space may be the same space or may have a similar shape or a similar area. For example, the counterpart space and the user space may be preassembled rooms or houses having the same shape and area or may be capsule units having the same shape and area. The counterpart space and the user space are respectively provided with the hardware platform.

When a counterpart implements event contents in the counterpart space, the counterpart space implementation device 10 generates an event contents receipt message including the event contents implemented in the user space, in response to a selection of the counterpart, and transmits the generated event contents receipt message to the space implementation server 100. The space implementation server 100 stores the event contents received from the counterpart space implementation server 100 by mapping the event contents to a counterpart identifier.

The counterpart space implementation device 10 performs communications with the hardware platform disposed in the counterpart space. When a specific piece of event contents is implemented using the hardware platform in the counterpart space, the counterpart space implementation device 10 receives contents regarding information implemented using the hardware platform and generates an event contents receipt message based on the received information regarding contents.

In addition, the user space implementation device 30 is disposed in the user space. When event contents request is made by a user, the user space implementation device 30 receives a corresponding piece of event contents from the space implementation server 100 and executes the received event contents using the user hardware platform, thereby implementing the same conditions in the user space as in the counterpart space.

The space implementation server 100 determines whether or not the user has authority to access the event contents of the counterpart or determines whether or not the user has high-level authority to access the event contents of the counterpart to selectively provide a piece of event contents to the user in response to event contents request from the user, or upon receiving the event contents from the counterpart space implementation device 10, to provide the event contents to the user space implementation device 30 in real time, so that the same event contents is implemented in real time in the counterpart space and the user space.

Here, the counterpart may be a family member, a lover, or a friend of the user or a favored entertainer. Since the user and the counterpart share the same spatial atmosphere in their own spaces, the user and the counterpart may create a bond or the user may be provided with pleasure, in that the user can experience the spatial atmosphere of the favored entertainer.

According to the present disclosure, the space implementation server 100 may be operated to charge for the use thereof such that the user or the counterpart pays a predetermined fee. The space implementation server 100 contains visual contents, audio contents, tactile contents, olfactory contents, and the like. When there is a contents request from the counterpart space implementation device 10 or the user space implementation device 30, the space implementation server 100 can provide requested contents to the counterpart space implementation device 10 or the user space implementation device 30 and charge a fee for the contents.

Figure 2:
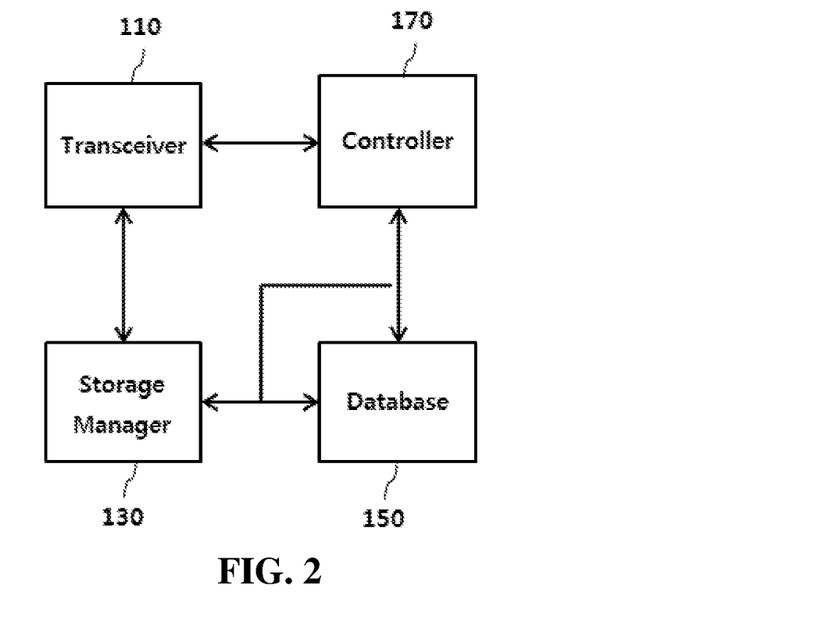
FIG. 2 is a functional block diagram illustrating a space implementation server according to the present disclosure.

FIG. 2 is a functional block diagram illustrating the space implementation server 100 according to the present disclosure.

Described in more detail with reference to FIG. 2, a transceiver 110 performs communications with the counterpart space implementation device 10 or the user space implementation device 30. The transceiver 110 receives messages from the counterpart space implementation device 10 or the user space implementation device 30 or transmits messages to the counterpart space implementation device 10 or the user space implementation device 30.

When an event contents receipt message regarding event contents that are implemented in the counterpart space is received from the counterpart space implementation device 10, the transceiver 110 provides the received event contents to a storage manager 130. The event contents receipt message may include a counterpart identifier, implementation information, and information regarding a hardware platform implementing the event contents, in addition to the event contents. Here, the event contents includes identifiers of visual, audio, tactile, and olfactory contents that are implemented in the counterpart space and information regarding environmental contents that are implemented in the counterpart space. The storage manager 130 identifies the counterpart based on the counterpart information stored in a database 150 and the received counterpart identifier and stores the received event contents in the database 150 by mapping the event contents to the counterpart identifier.

The storage manager 130 determines whether or not there is a higher-level friend in a friend list of the counterpart, based on the friend list of the counterpart stored in the database 150, and when there is the higher-level friend, provides a real-time notification message to a controller 170 at a point in time in which the event contents is received.

When the real-time notification message is received, the controller 170 transmits an implementation message to a space implementation device of the higher-level friend, for example, the user space implementation device 30. When an implementation approval message in response to the implementation message is received from the user space implementation device 30, the controller 170 determines whether or not the event contents of the counterpart can be implemented using the hardware platform in the user space. When the event contents of the counterpart can be implemented using the hardware platform in the user space, the controller 170 controls the event contents of the counterpart to be transmitted to the user space implementation device 30, so that the same event contents are implemented in real time in the counterpart space and in the user space.

When the event contents request message is received from the user space implementation device 30 via the transceiver 110, the controller 170 determines whether or not the user has authority to access the event contents of the counterpart and whether or not the event contents of the counterpart can be implemented using the hardware platform in the user space, based on a user identifier included in the event contents request message. When the user has authority to access the event contents of the counterpart and the event contents of the counterpart can be implemented using the hardware platform in the user space, the controller 170 transmits the requested event message to the user space implementation device 30.

Figure 3:
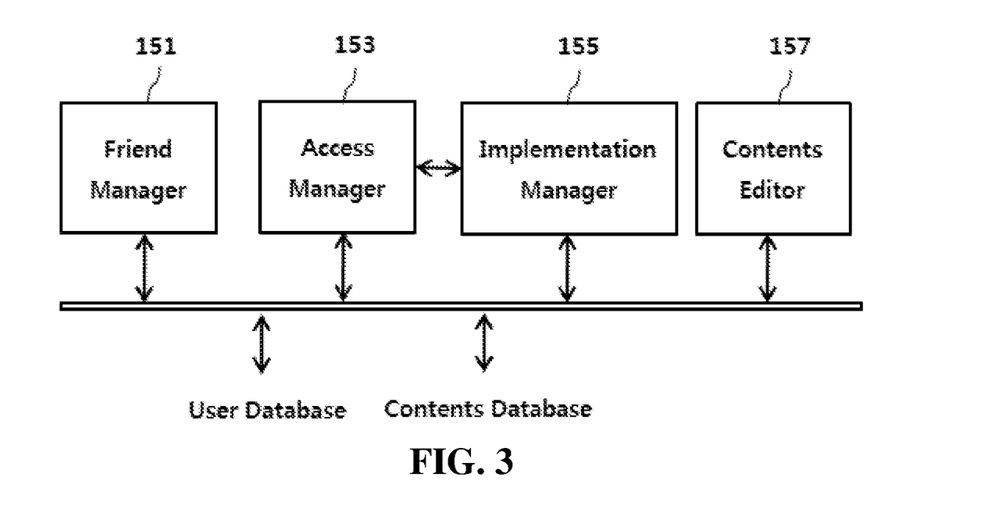
FIG. 3 is a functional block diagram illustrating an example of the controller according to the present disclosure.

FIG. 3 is a functional block diagram illustrating an example of the controller according to the present disclosure.

Described in more detail with reference to FIG. 3, a friend manager 151 selects a friend having authority to access event contents provided by a counterpart or selects a friend having a higher level from among friends having access authority. For example, the counterpart logs in the space implementation server using, for example, a personal computer (PC) or a smartphone, and transmits a friend request message to a friend terminal, which is to be selected as a friend, via the space implementation server. When a friend response message is received via the friend terminal, the friend manager 151 stores and registers the corresponding friend in the friend list of the counterpart. The friend manager 151 can set levels of access authority in the friend list. For example, when a setting signal for setting levels of access authority is received via the counterpart terminal, the friend manager 151 can set a higher level of access authority, such as a family member or a lover, in the friend list, in response to the set signal.

The friend manager 151 stores both identifiers of friends and identifiers of space implementation devices of the friends when registering the friends in the friend list. The counterpart terminal or the friend terminal may be fabricated integrally with the space implementation device. This feature is within the scope of the present disclosure.

When a request message for event contents of the counterpart is received from the friend, i.e. the user space implementation device, an access manager 153 determines whether or not the user has authority to access the event contents of the counterpart, based on the friend list of the counterpart of the database.

When the user has authority to access the event contents of the counterpart, an implementation manager 155 determines whether or not the event contents of the counterpart requested by the user can be implemented using the hardware platform in the user space. The database contains information regarding the hardware platform for implementing the event contents of the counterpart and information regarding the hardware platform disposed in the user space. The implementation manager 155 compares the hardware platform required for implementing the event contents and the hardware platform in the user space and determines whether or not the event contents of the counterpart can be implemented in the user space.

When a real-time notification message is received, the implementation manager 155 transmits the event contents of the counterpart to the user space implementation device having a higher level of access authority, thereby controlling the event contents implemented in the counterpart space to be simultaneously implemented in the user space.

A contents editor 157 extracts specific contents of the event contents of the counterpart from the database, based on identifiers of the specific contents of the event contents of the counterpart, edits the event contents composed of the extracted contents, and provides the edited event contents to the implementation manager 155. The implementation manager 155 transmits the event contents, provided by the contents editor 157, to the user space implementation device.

The event contents receipt message, received from the space implementation device of the counterpart, may include the identifiers of the specific contents of the event contents, and the contents editor 157 may reedit the event contents by directly extracting the specific contents of the event contents from the database, based on the contents identifiers, thereby reducing the load of data transmitted and received between the space implementation device of the counterpart and the space implementation server.

Figure 4:
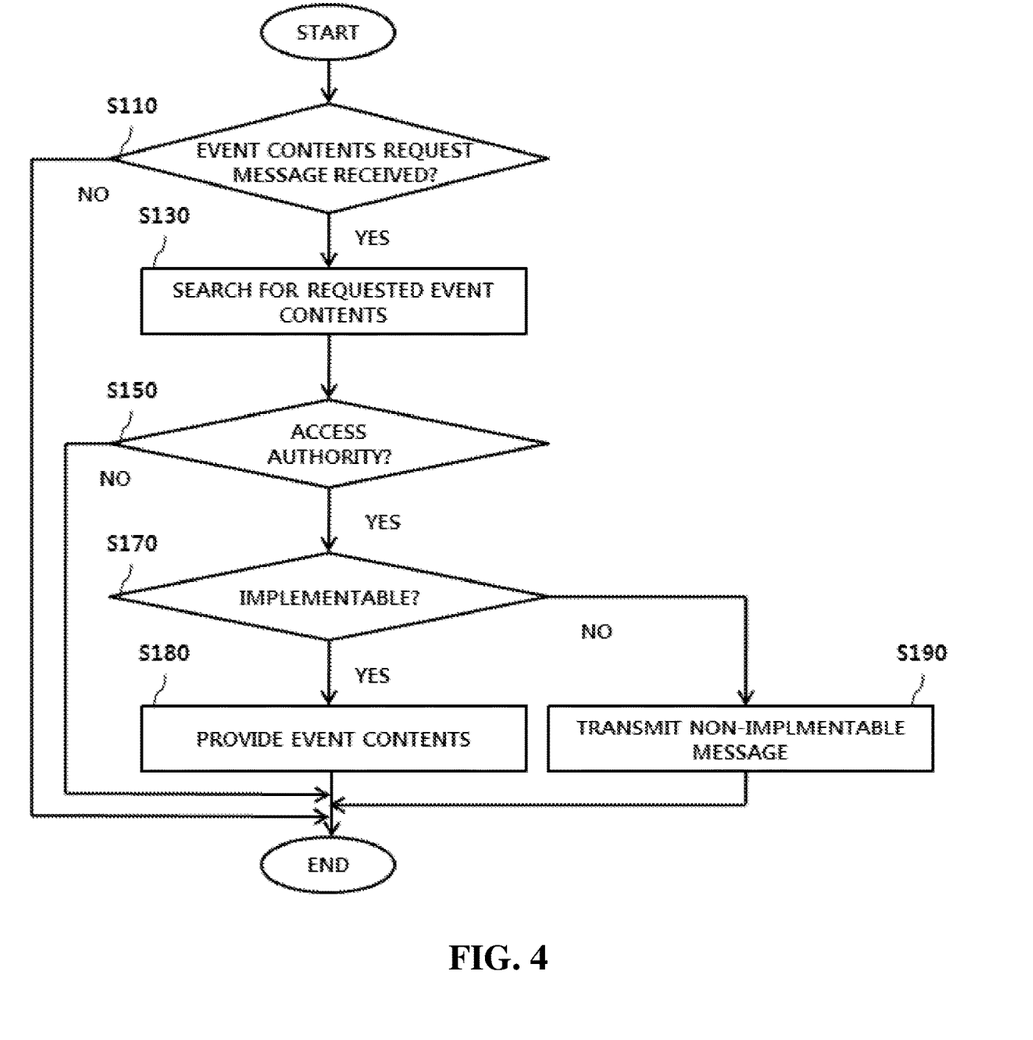
FIG. 4 is a flowchart illustrating a space implementation method according to the present disclosure.

FIG. 4 is a flowchart illustrating a space implementation method according to the present disclosure.

Described in more detail with reference to FIG. 4, when event contents request message for requesting event contents from the counterpart is received from the user space implementation device in S110, the database is searched for the requested event contents in S130. The event contents request message includes a search index of the event contents requested by the user, and the database is searched for the event contents corresponding to the search index. The search index may be, for example, the writer, atmosphere, date, or circumstance of the event contents.

In S150, it is determined whether or not the user has authority to access the searched event contents, based on the friend list of the counterpart who composed the searched event contents. When the user has authority to access the event contents of the counterpart, it is determined whether or not the searched event contents can be implemented using the hardware platform in the user space in S170.

When the event contents requested by the user can be implemented using the hardware platform of the user space, the event contents is provided to the user space implementation device in S180. However, when the event contents requested by the user cannot be implemented using the hardware platform, an non-implementable message for notifying the requested event contents cannot be implemented is transmitted to the user space implementation device in S190. The non-implementable message includes information regarding a hardware platform additionally required for implementing the event contents and information regarding the purchase of the additionally required hardware platform.

Figure 5:
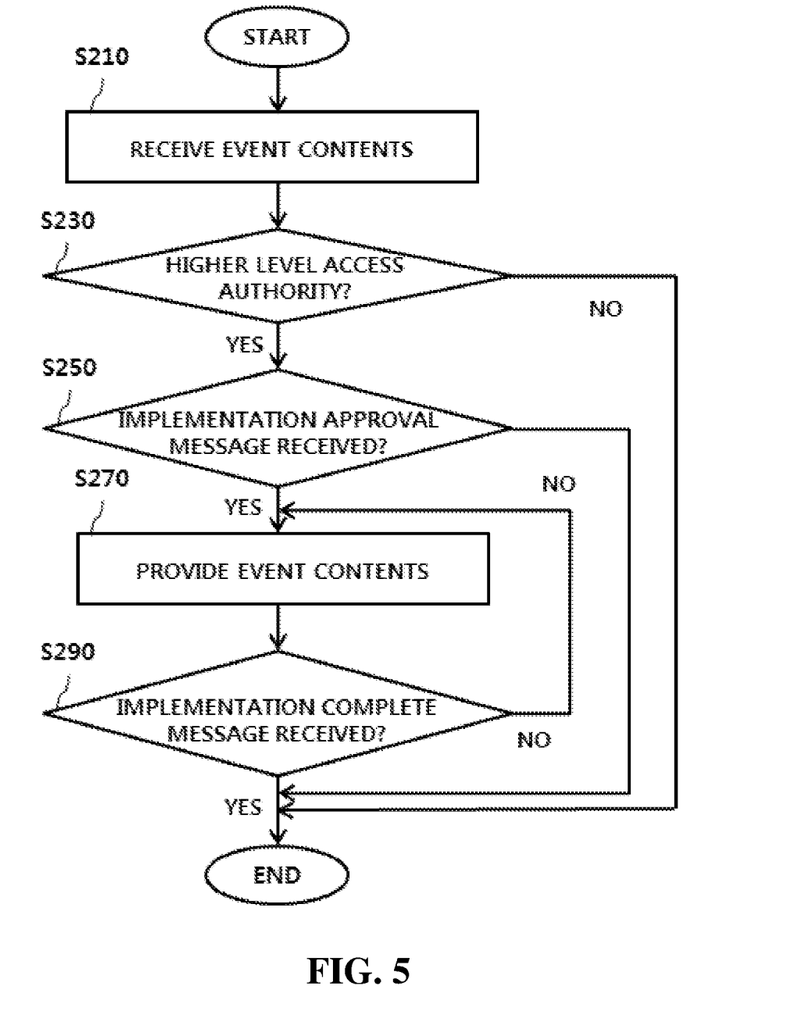
FIG. 5 is a flowchart illustrating a method of implementing event contents in real time in a user space having a higher access level, the event contents being the same as those being implemented in a counterpart space.

FIG. 5 is a flowchart illustrating a method of implementing event contents in real time in a user space having a higher access level, the event contents being the same as those being implemented in a counterpart space.

Described in more detail with reference to FIG. 5, when the event contents of the counterpart is received from the counterpart space implementation device in S210, it is determined whether or not a user having a higher level of access authority is present based on the friend list of the counterpart in S230.

When a user having a higher level of access authority is present in the friend list of the counterpart, an implementation message is transmitted to the user space implementation device of the user having the higher level of access authority, and it is determined whether or not an implementation approval message is received from the user space implementation device in response to the implementation message in S250. The implementation message includes an identifier of the counterpart and a message inquiring whether or not and the event contents of the counterpart are to be implemented in real time. Before the implementation message is transmitted to the user space implementation device, the hardware platform disposed in the counterpart space is compared with the hardware platform disposed in the user space to determine whether or not the event contents of the counterpart can be implemented in the user space. When the event contents of the counterpart are determined to be implementable in the user space, the implementation message is transmitted to the user space implementation device.

When the implementation approval message is received from the user space implementation device, event contents transmission message including the event contents of the counterpart is transmitted to the user space implementation device in S270. The event contents is received in real time from the counterpart space implementation device, specific contents of the event contents are extracted from the database, based on the identifiers of the contents of the received event contents, and event contents transmission message including the extracted contents is transmitted to the user space implementation device.

The event contents, which are being implemented in the counterpart space, are received from the counterpart space implementation device. The event contents received in real time is provided to the user space implementation device, so that the same event contents as in the counterpart space is implemented in the user space in real time. When an implementation complete message is received from the user space implementation device, the transmission of the event contents to the user space implementation device is stopped in S290.

Figure 6:
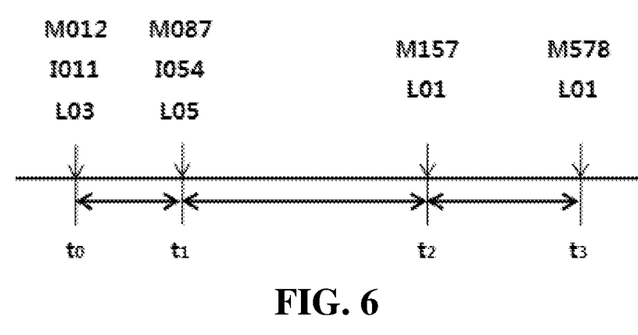
FIG. 6 illustrates an example of an event contents receipt message received from the counterpart space implementation device.

FIG. 6 illustrates an example of an event contents receipt message received from the counterpart space implementation device. As illustrated in FIG. 6, an event contents receipt message includes identifiers M012, I011, and L3 of contents implemented at a point in time to using the hardware platform in the counterpart space. An event contents receipt message received thereafter includes identifiers M087, I054, and L05 of contents implemented at a point in time $t_1$ using the hardware platform in the counterpart space. An event contents receipt message received thereafter includes identifiers M157 and L01 of contents implemented at a point in time $t_2$ using the hardware platform in the counterpart space. Whenever new event contents are implemented in the counterpart space, an event contents receipt message is received from the counterpart space implementation device.

As described above, the event contents receipt message includes identifiers of contents and information regarding the point in time in which the contents are implemented. The event contents receipt message includes the contents identifiers instead of directly including the contents, and the space implementation server provides the contents corresponding to the contents identifiers by extracting the contents. It is thereby possible to reduce the load of data transmitted and received between the counterpart space implementation device and the space implementation server. In addition, based on information regarding a time in which new event contents are implemented, received whenever a specific piece of content of the event contents is changed, the same event contents as implemented in the counterpart space can be implemented in the user space. For example, previous event contents may be stopped while being implemented, or implementation may be suspended for a specific period of time after the previous event contents are completed before new event contents are implemented.

When the same event contents implemented as in the counterpart space are implemented in real time in the user space, the event contents being implemented in the counterpart space at the present point in time are provided to the user space implementation device in real time, in synchronization with the event contents being implemented in the counterpart space.

Figure 7:
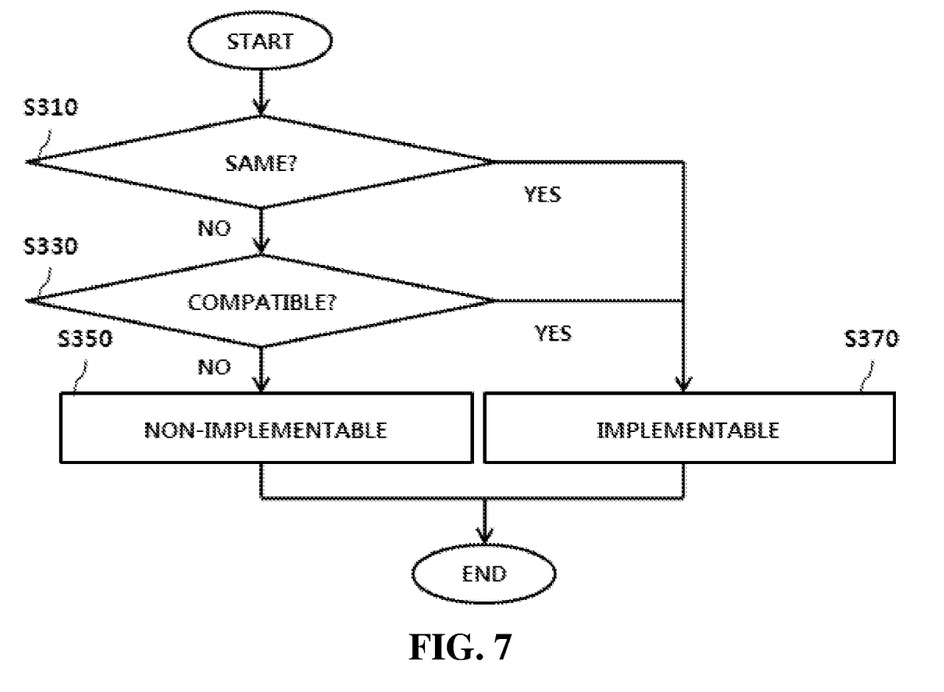
FIG. 7 is a flowchart illustrating a method of determining whether or not event contents of a counterpart are implementable in a user space.

FIG. 7 is a flowchart illustrating a method of determining whether or not event contents of a counterpart are implementable in a user space.

Described in more detail with reference to FIG. 7, in S310, it is determined whether or not the hardware platform implementing the event contents in the counterpart space is the same as the hardware platform in the user space by comparing the hardware platform implementing the event contents in the counterpart space with the hardware platform in the user space.

When the hardware platform implementing the event contents in the counterpart space, is not the same as the hardware platform in the user space, it is determined whether or not the hardware platform implementing the event contents in the counterpart space is compatible with the hardware platform in the user space in S330.

When the hardware platform implementing the event contents in the counterpart space, is the same as or compatible with the hardware platform in the user space, it is determined that the event contents of the counterpart can be implemented in the user space in S370. However, when the hardware platform implementing the event contents in the counterpart space, is neither the same as nor compatible with the hardware platform in the user space, it is determined that the event contents of the counterpart cannot be implemented in the user space in S350.

Figure 8:
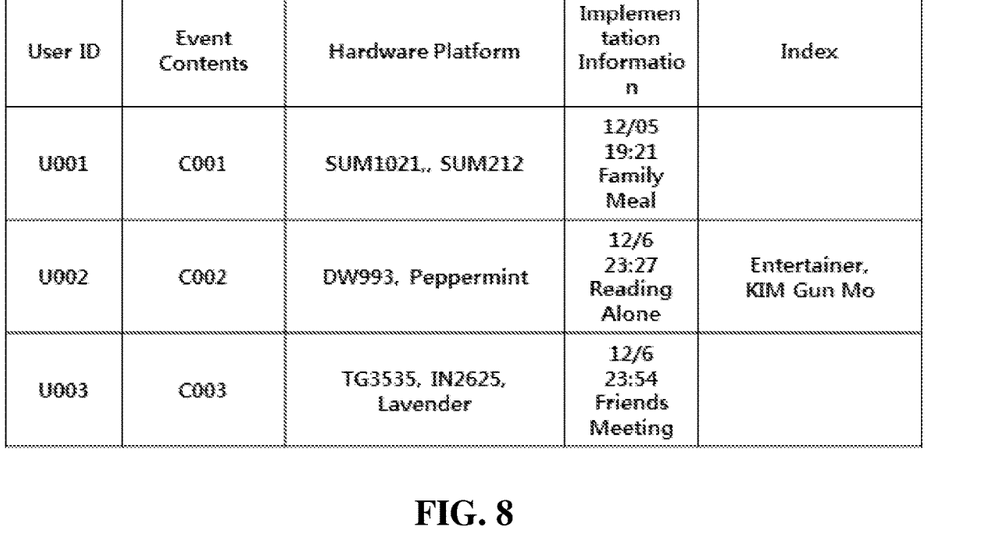
FIG. 8 illustrates examples of information included in an event contents receipt message received from a counterpart space implementation device.

FIG. 8 illustrates examples of information included in an event contents receipt message received from the counterpart space implementation device. The information includes: identifiers (i.e. user IDs) of counterparts; identifiers of event contents; identifiers of hardware platforms used in implementing the event contents; information regarding the implementation of the event contents, such as a date, a time, and a circumstance; and indexes representing characteristics of the event contents, such as writers and entertainers.

Figure 9:
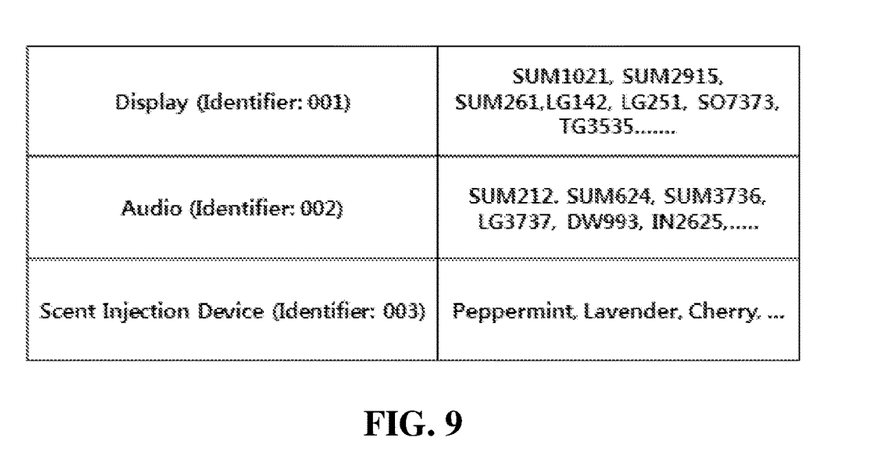
FIG. 9 illustrates an example of a group of hardware platforms stored in a space implementation server.

FIG. 9 illustrates an example of a group of hardware platforms stored in the space implementation server.

Referring to FIGS. 8 and 9, it is determined whether or not a hardware platform of a received event contents receipt message is the same as a hardware platform disposed in a user space. Information regarding hardware platforms disposed in user spaces may be stored in the database, mapped to user identifiers.

In the case that the hardware platform of the received event contents receipt message is not the same as the hardware platform disposed in the user space, when the hardware platform disposed in the user space belongs to the same device group of hardware platforms implementing event contents of the counterpart, the hardware platform implementing the event contents in the counterpart space, is determined to be compatible with the hardware platform in the user space.

For example, when a device group including the hardware platform used in implementing the event contents is Display 001 and both an identifier SUM1021 of a device implementing the event contents in the counterpart space and an identifier LG251 of a device disposed in the user space are present in the device group, the devices are determined to be compatible.

The above-described embodiments of the present disclosure can be recorded as computer executable programs, and can be realized in a general purpose computer that executes the program using a computer readable recording medium.

Examples of the computer readable recording medium include a magnetic storage medium (e.g. a floppy disk or a hard disk), an optical recording medium (e.g. a compact disc read only memory (CD-ROM) or a digital versatile disc (DVD)), and a carrier wave (e.g. transmission via the Internet).

While the present disclosure has been described with reference to the certain exemplary embodiments shown in the drawings, these embodiments are illustrative only. Rather, it will be understood by a person skilled in the art that various modifications and equivalent other embodiments may be made therefrom. Therefore, the true scope of the present disclosure shall be defined by the concept of the appended claims.

The invention claimed is:

1. A space implementation method comprising:
receiving, by a space server containing event contents in a counterpart space, an event contents request message from a user terminal;
determining whether or not the event contents are implementable in a user space by comparing a hardware platform implementing the event contents in the counterpart space with a hardware platform in the user space; and
when the event contents are determined to be implementable in the user space, controlling the event contents to be implemented in the user space by providing the event contents to the user terminal,
wherein the event contents in the counterpart space comprise at least one of visual, audio, tactile, olfactory, and environmental contents that are implemented in the counterpart space,
wherein determining whether or not the event contents are implementable comprises:
determining whether or not the hardware platform implementing the event contents in the counterpart space are same as the hardware platform in the user space by comparing the hardware platform implementing the event contents in the counterpart space with the hardware platform in the user space;
when the hardware platform implementing the event contents in the counterpart space is not same as the hardware platform in the user space, determining whether or not the hardware platform implementing the event contents in the counterpart space is compatible with the hardware platform in the user space; and
when the hardware platform implementing the event contents in the counterpart space is compatible with the hardware platform in the user space, determining the event contents to be implementable,
wherein the hardware platform in the counterpart space is determined whether or not to be same as the hardware platform in the user space, based on identifiers of devices of the hardware platform in the counterpart space and identifiers of devices of the hardware platform in the user space,
wherein the method further comprises determining whether or not the user has authority to access the event contents of the counterpart based on a friend list of a counterpart,
wherein, when the user has authority to access the event contents of the counterpart, the event contents in the counterpart space are provided to the user terminal,
wherein, when a user in the friend list of the counterpart has a higher level of access authority, the user space is controlled such that same event contents as in the counterpart space are implemented in real time therein, and
wherein the method further comprises:
at a point in time in which the event contents in the counterpart space are received from a counterpart terminal, determining whether or not there is a user having the higher level of access in the friend list of the counterpart;
transmitting an implementation message to the user terminal of the user having the higher level of access in the friend list of the counterpart, the implementation message notifying that the event contents are being implemented in the counterpart space; and
when an implementation approval message is received from the user terminal, providing same event contents as the event contents implemented in the counterpart space to the user terminal in real time.

2. The space implementation method according to claim 1, wherein the hardware platform is a combination of devices provided in the counterpart space to implement the event contents or devices provided in the user space to implement the event contents.

3. The space implementation method according to claim 1, wherein the hardware platform in the counterpart space is determined whether or not to be compatible with the hardware platform in the user space, based on whether or not the hardware platform in the user space comprises a device included in a group of compatible devices corresponding to the identifiers of devices of the hardware platform in the counterpart space.

4. The space implementation method according to claim 3, further comprising:
receiving indexes of the event contents to be implemented in the user space from the user terminal; and
searching for event contents, from among disclosed event contents in the counterpart space, corresponding to the received indexes of the event contents,
wherein the searched event contents are determined whether or not to be implementable in the user space and determined implementability is provided to the user terminal.

5. The space implementation method according to claim 3, further comprising determining whether or not the user has authority to access the event contents of the counterpart based on a friend list of the counterpart,
wherein, when the user has authority to access the event contents of the counterpart, the event contents in the counterpart space are provided to the user terminal.

6. The space implementation method according to claim 1, further comprising:
receiving indexes of the event contents to be implemented in the user space from the user terminal; and
searching for event contents, from among disclosed event contents in the counterpart space, corresponding to the received indexes of the event contents,
wherein the searched event contents are determined whether or not to be implementable in the user space and determined implementability is provided to the user terminal.

7. The space implementation method according to claim 1, wherein the event contents in the counterpart space and information regarding implementation of the event contents in the counterpart space are provided to the user terminal.

8. The space implementation method according to claim 1, wherein, when a user in the friend list of the counterpart has a higher level of access authority, the user space is controlled such that same event contents as in the counterpart space are implemented in real time therein.

9. A space implementation method comprising:
at a point in time in which an event contents receipt message including information regarding event contents implemented in a counterpart space is received from a counterpart terminal, determining whether or not there is a user having access authority in a friend list of a counterpart;
transmitting an implementation message to a user terminal of the user having the access authority, the implementation message notifying that the event contents are being implemented in the counterpart space;
when an implementation approval message is received from the user terminal, determining whether or not the event contents are implementable in the user space by comparing a hardware platform implementing the event contents in the counterpart space with a hardware platform in the user space; and
when the event contents are determined to be implementable in the user space, controlling the same event contents to be implemented in the user space as in the counterpart space by providing an event contents transmission message to the user terminal in real time, the event contents transmission message including information regarding the same event contents implemented in the counterpart space,
wherein the event contents transmission message includes information regarding an implementation time of the event contents, such that the same event contents are controlled to be implemented in real time, synchronized in the counterpart space and the user space, and
wherein the event contents receipt message comprises contents identifiers of the event contents, such that the event contents transmission message including the event contents is generated by extracting the event contents corresponding to the contents identifiers from a database.

* * * * *